United States Patent
Locker et al.

(10) Patent No.: US 7,376,286 B2
(45) Date of Patent: May 20, 2008

(54) BLOCK-BASED ROTATION OF ARBITRARY-SHAPED IMAGES

(75) Inventors: Kevin Locker, Scottsdale, AZ (US); Judson Lehman, Scottsdale, AZ (US)

(73) Assignee: NXP B.V., Eindhoven (NL)

( * ) Notice: Subject to any disclaimer, the term of this patent is extended or adjusted under 35 U.S.C. 154(b) by 527 days.

(21) Appl. No.: 10/245,984

(22) Filed: Sep. 18, 2002

(65) Prior Publication Data

US 2004/0052431 A1 Mar. 18, 2004

(51) Int. Cl.
G06K 9/32 (2006.01)
G09G 5/00 (2006.01)

(52) U.S. Cl. ...................... 382/296; 345/649

(58) Field of Classification Search ........ 382/289–297, 382/305; 345/473, 658, 418, 648, 649, 672, 345/686; 358/1.18, 1.16
See application file for complete search history.

(56) References Cited

U.S. PATENT DOCUMENTS

| | | | | |
|---|---|---|---|---|
| 4,947,344 A | | 8/1990 | Hayashi et al. ............. 364/518 |
| 5,012,434 A | * | 4/1991 | Zietlow et al. ............ 358/1.18 |
| 5,111,192 A | * | 5/1992 | Kadakia ...................... 345/658 |
| 5,854,641 A | | 12/1998 | Howard et al. ............. 345/517 |
| 5,966,116 A | * | 10/1999 | Wakeland ................... 345/658 |
| 6,208,429 B1 | * | 3/2001 | Anderson .................. 358/1.18 |
| 6,215,494 B1 | * | 4/2001 | Teo ............................ 345/418 |
| 6,486,881 B2 | * | 11/2002 | Hunter et al. ............... 345/473 |
| 2001/0019637 A1 | | 9/2001 | Robey et al. | |

FOREIGN PATENT DOCUMENTS

EP 0 996 089 A1 4/2000

* cited by examiner

*Primary Examiner*—Kanji Patel
(74) *Attorney, Agent, or Firm*—Peter Zawilski

(57) ABSTRACT

An apparatus, program product and method for rotating image data using a block-based approach, wherein for each of a plurality of blocks of image data that define an image, a translation vector is applied to the block to translate the block a desired angle of rotation about a rotation point, e.g., to translate an anchor position for the block from a source point to a destination point. In addition, the image data within the block is rotated according to the desired angle of rotation, such that when the rotated image data is stored at the destination point of the block, the image data within the block is effectively rotated to the desired position.

41 Claims, 5 Drawing Sheets

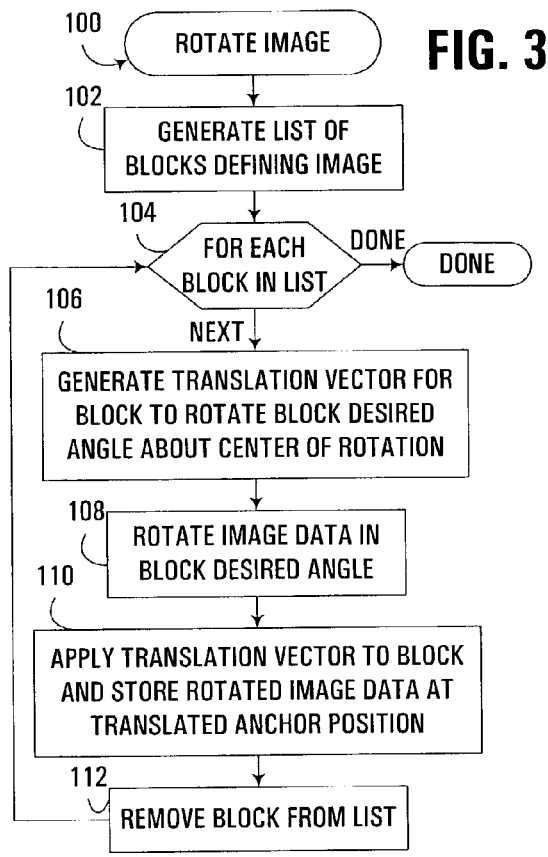
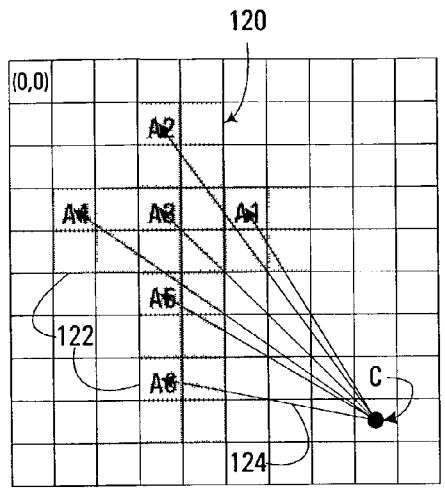
FIG. 3
FIG. 4
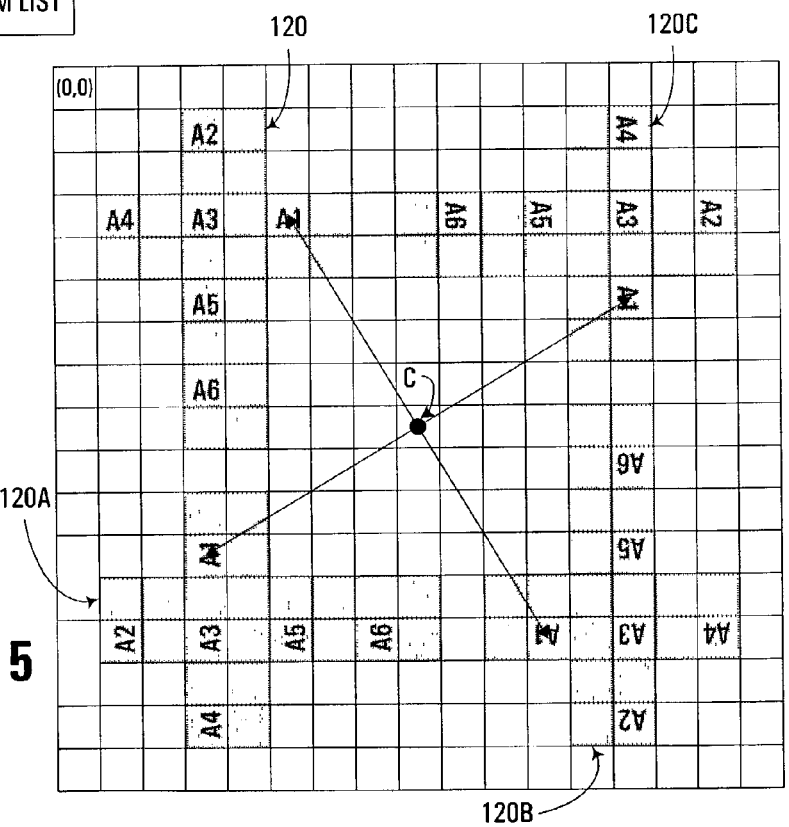
FIG. 5

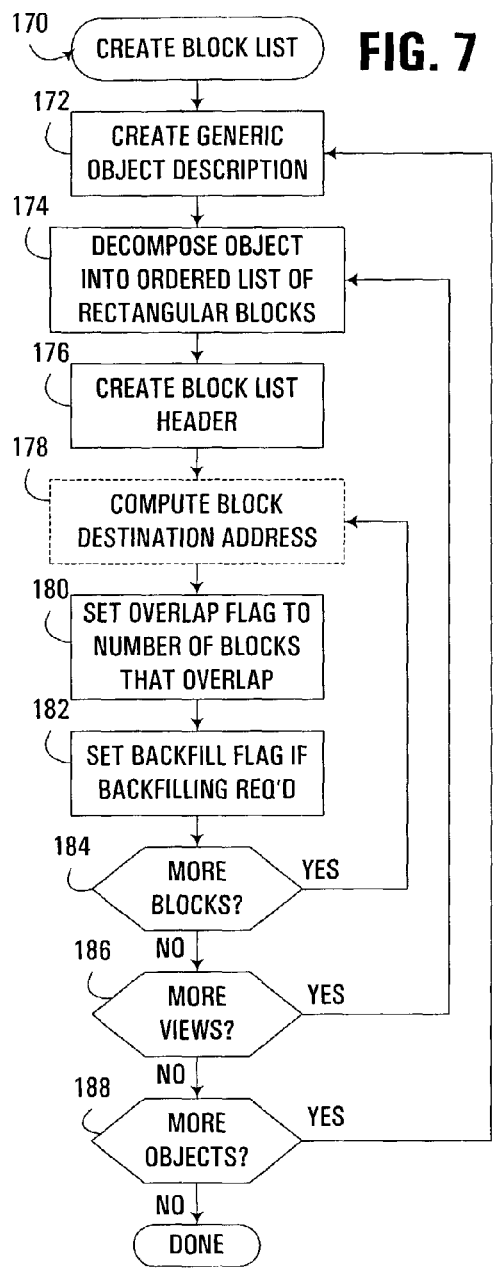
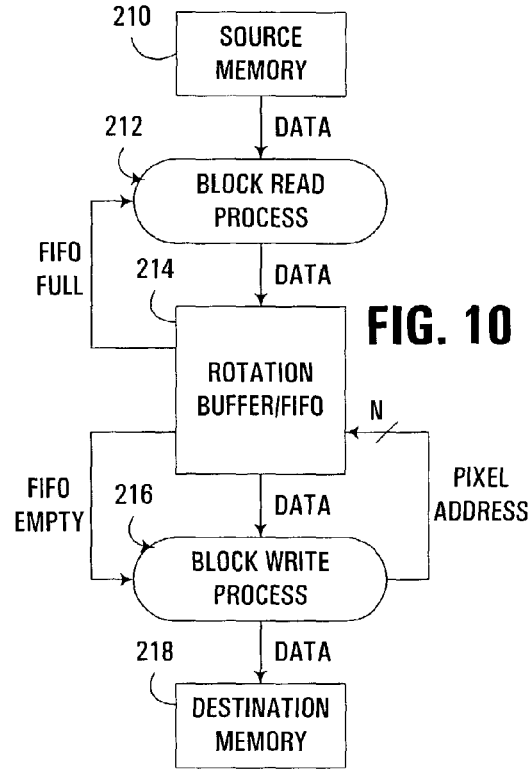
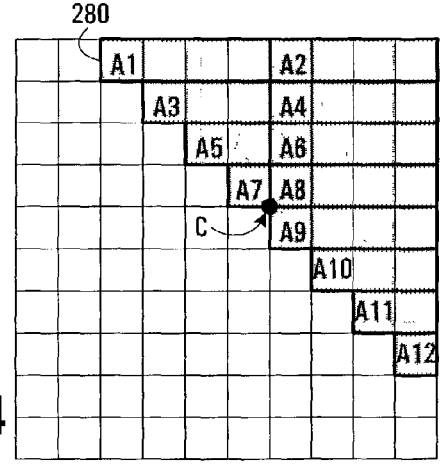
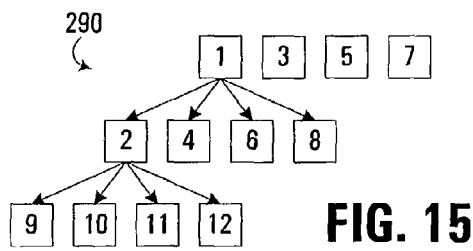
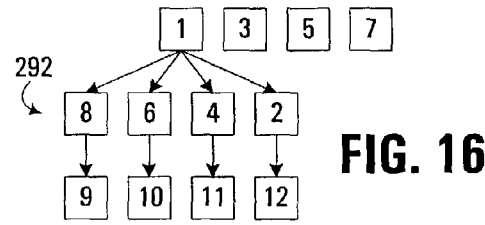

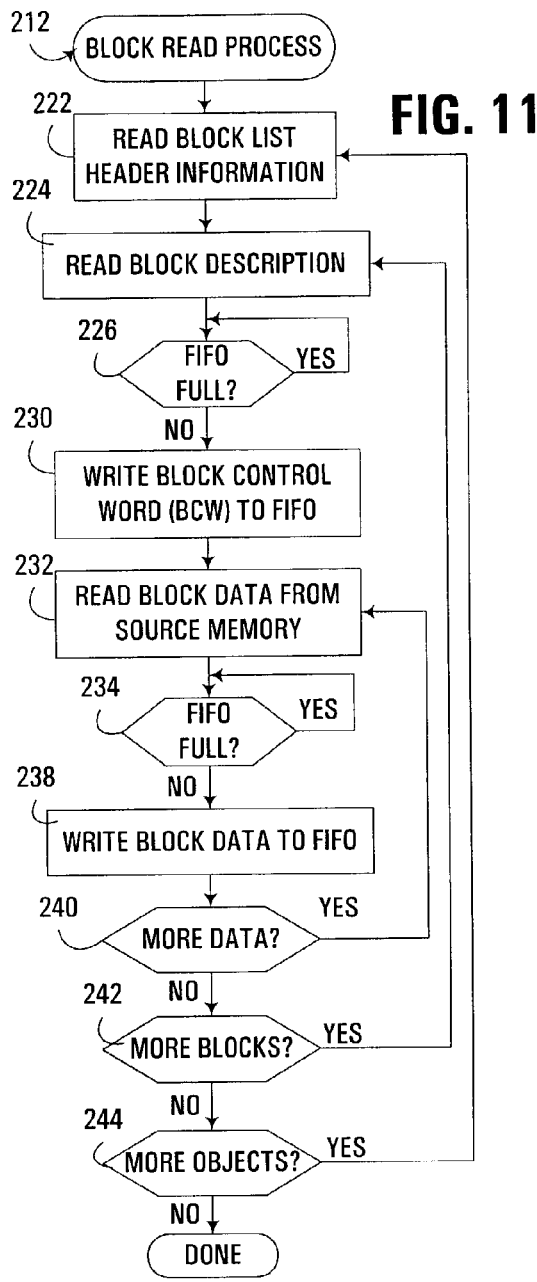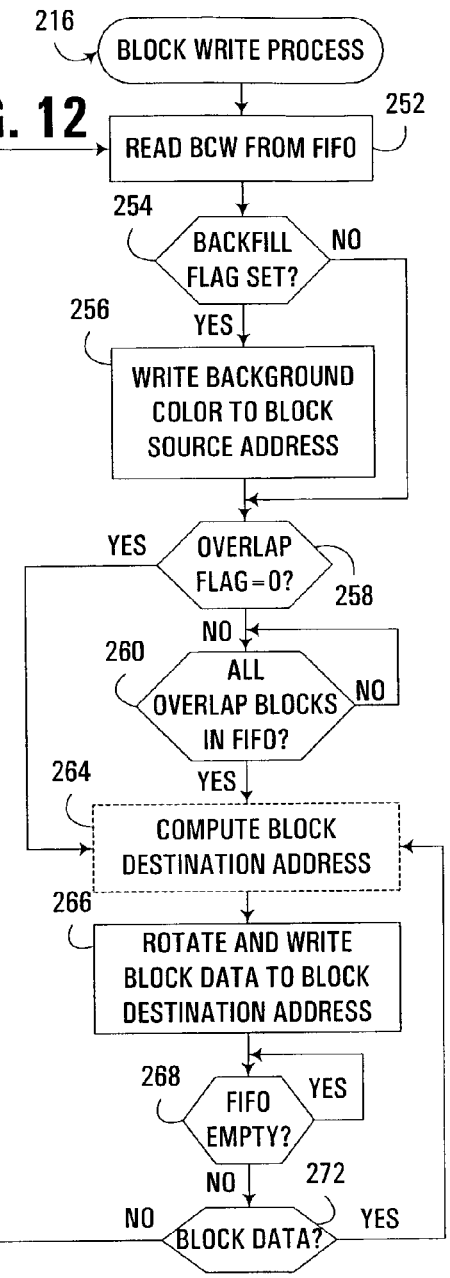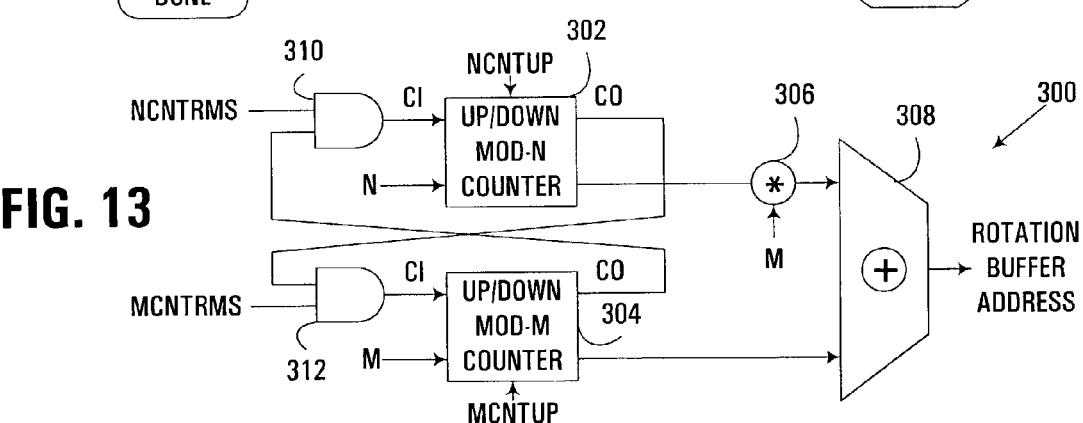

BLOCK-BASED ROTATION OF ARBITRARY-SHAPED IMAGES

FIELD OF THE INVENTION

The invention is generally related to the manipulation of digital image data, and in particular, to the rotation of image data.

BACKGROUND OF THE INVENTION

The processing of graphical or image data in a computer or other data processing system is often extremely computationally expensive, requiring significant memory and processor resources. In many data processing systems, images are represented by arrays of pixel elements, or "pixels," with each pixel having a "color depth" that defines the total number of color variations that may be represented in each pixel. As the resolution and/or color depth of an image is increased, the perceived quality of an image, which may be reflected in terms of realism, accuracy, sharpness, vibrancy, etc., also increases. Thus, a continuing need has existed for data processing system support of images with increased resolution and/or color depth.

As a general rule, the greater the resolution and/or color depth of an image, the greater amount of image data that is required to represent the image. Moreover, as the amount of image data used to represent an image increases, the amount of computer resources required to store, transmit and manipulate the image also increases.

One specific type of graphic manipulation that typically requires substantial computational resources is that of image rotation. Image rotation has a number of useful benefits such as in converting images between landscape and portrait orientations for display, faxing, copying, and printing purposes. Also, computer aided design, graphics design, image processing and other video and graphical development environments often utilize image rotation to manipulate image data in a user-created document. Moreover, it is envisioned that as hand-held electronic devices become more prevalent, a need will exist for more flexible displays that are capable of displaying an image at different viewing angles to accommodate multiple form factors for a device.

Traditional image rotation algorithms typically are implemented in software, and involve a number of computationally expensive matrix transform operations. Such algorithms are typically limited to operating with rectangular images, such as an entire image stored in a frame buffer. Moreover, due to the substantial computing resources required to perform such matrix transformations, most software-based algorithms are not well suited for use in low power applications such as hand-held devices, wireless telecommunication devices, digital cameras, etc.

To address the excessive resource requirements of most software-based algorithms, attempts have been made to utilize specialized hardware to perform some image rotation functions. For example, specialized memory access circuitry has been utilized to permit non-sequential accesses to a frame buffer to occur such that a frame buffer is read out column by column, rather than row by row, to effectively generate a 90 degree rotated image on a display. Non-sequential accesses to a memory buffer, however, are often inefficient, and may bypass other performance enhancing circuitry such as memory caches and prefetch circuitry, and thus may have a negative impact on performance. Furthermore, such hardware acceleration often is limited to very specialized applications, and as is often limited to servicing only specifically-sized rectangular images.

While the focus by conventional image rotation algorithms on rectangular images is often sufficient in many applications, in some applications, such a focus tends to introduce inefficiencies during image rotation processing. As an example, using conventional image rotation algorithms, an image must be bound by a rectangular area for processing by such algorithms. Where the shape of the germane (non-background) image data in an image is non-rectangular in nature, however, bounding such an area by a rectangle may introduce a substantial amount of whitespace or background data. Most conventional image rotation algorithms, however, are not capable of determining when image data is germane to an image or when such image data constitutes a background color, so all image data in a rectangular area is processed in roughly the same manner. Thus, significant processing resources may be expended rotating image data that is not particularly germane to the actual image being rotated.

Therefore, a significant need continues to exist for a flexible image rotation algorithm that has wide applicability over different applications. In particular, a need exists for an image rotation algorithm that may be utilized in connection with various types of images, including various sizes and shapes of images, and which is adaptable to data processing systems having various hardware and/or software capabilities.

SUMMARY OF THE INVENTION

The invention addresses these and other problems associated with the prior art in providing an apparatus, program product and method in which image data is rotated using a block-based approach, wherein for each of a plurality of blocks of image data that define an image, a translation vector is applied to the block to translate the block a desired angle of rotation about a rotation point, e.g., to translate an anchor position for the block from a source point to a destination point. In addition, the image data within the block is rotated according to the desired angle of rotation, such that when the rotated image data is stored at the destination point of the block, the image data within the block is effectively rotated to the desired position.

Furthermore, in some embodiments consistent with the invention, a rotation buffer may be utilized to facilitate the rotation of blocks of image data by temporarily storing overlapped blocks of image data. Often, by doing so, image rotation may be performed in situ in a memory, thus eliminating the need for separate source and destination memories during image rotation.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 3 is a flowchart illustrating the principal operations in an exemplary image rotation routine capable of being executed by the apparatus of FIG. 1.

FIG. 4 is a block diagram of an exemplary image to be rotated about a center of rotation using the routine of FIG. 3.

FIG. 5 is a block diagram illustrating the rotation of the image of FIG. 4 90, 180 and 270 degrees about the center of rotation.

FIG. 7 is a flowchart illustrating a create block list routine capable of being executed by the apparatus of FIG. 1.

FIG. 10 is a block diagram illustrating the data flow between a source memory and a destination memory in the apparatus of FIG. 1.

FIG. 11 is a flowchart illustrating the program flow of the block read process referenced in FIG. 10.

FIG. 12 is a flowchart illustrating the program flow of the block write process referenced in FIG. 10.

FIG. 13 is a block diagram of an exemplary rotation buffer address calculation circuit for use in the block write process of FIG. 12.

FIG. 14 is a block diagram of another exemplary image to be rotated about a center of rotation using the apparatus of FIG. 1.

FIG. 15 is a tree graph representing one exemplary block ordering for the exemplary image of FIG. 14.

FIG. 16 is a tree graph representing another exemplary block ordering for the exemplary image of FIG. 14.

DETAILED DESCRIPTION

The illustrated embodiments of the invention implement block-based image rotation to facilitate the fast and efficient rotation of image data in an electronic device. As will become more apparent below, the herein-described embodiments may often be implemented to differing extents in hardware and software to support a multitude of applications, including low cost and/or low power applications such as may be desirable in handheld and wireless telecommunication devices such as PDA's, cell phones and the like. Moreover, while the herein-described embodiments may be utilized to rotate image data from a rectangular image, the principles of the invention may apply to images of practically any arbitrary shape, including non-rectangular images where the boundaries of the images themselves, or of the blocks that are used to define the image, bound a non-rectangular perimeter.

As will become more apparent below, embodiments consistent with the invention rotate an image by processing image data that has been organized into a plurality of blocks. For each individual block, a translation vector is applied to that block to translate the block a desired angle of rotation about a rotation point. In addition, the image data within each block is rotated according to the desired angle of rotation, typically through the use of a rotation buffer that incorporates dedicated rotation acceleration circuitry. Through the combination of the translation of the block and the rotation of the image data within the block, the block of image data is effectively rotated to its desired position.

Figure 1:
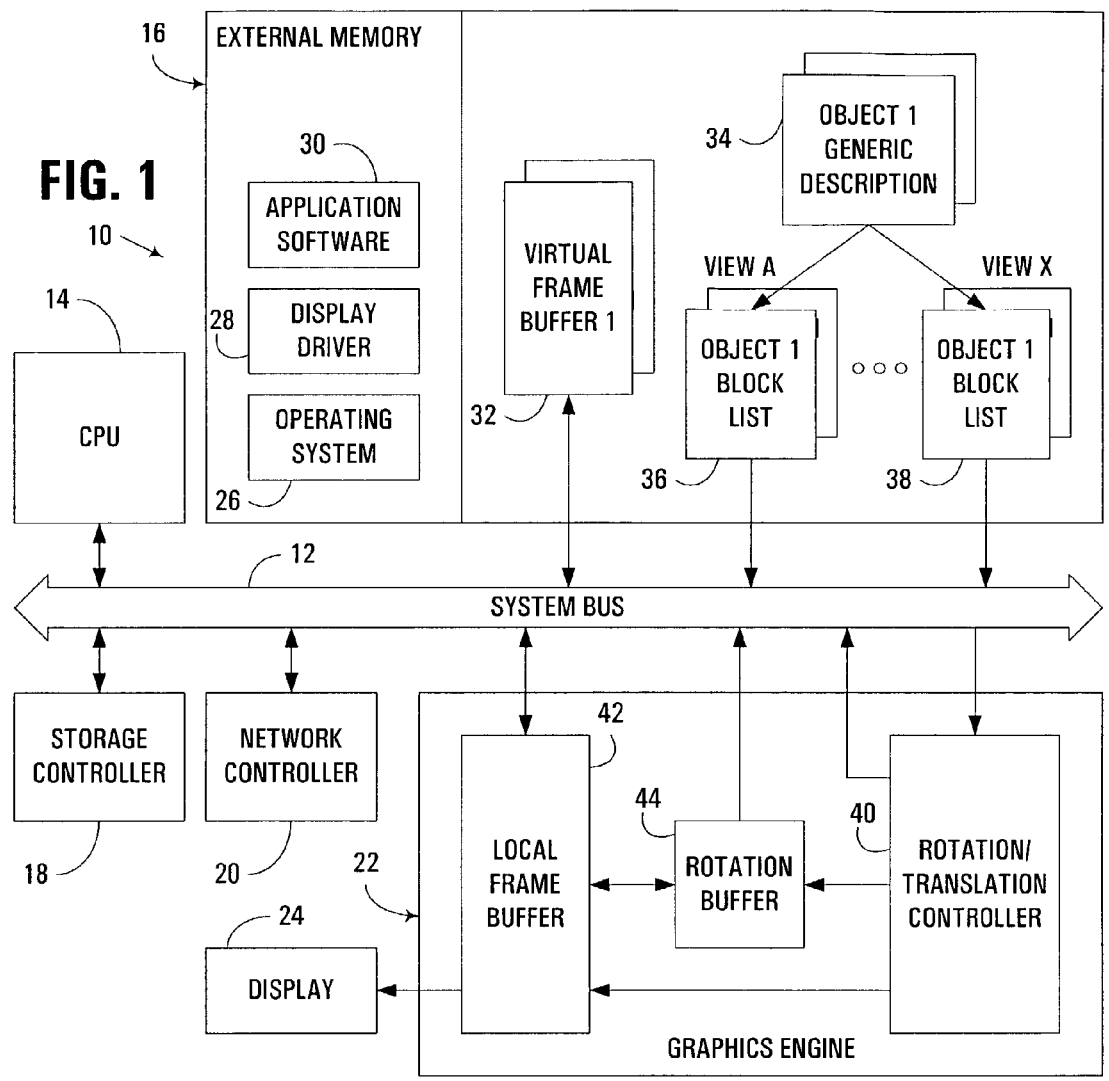
FIG. 1 is a block diagram of an apparatus implementing block-based image rotation consistent with the invention.

Turning now to the Drawings, wherein like numbers denote like parts throughout the several views, FIG. 1 illustrates an exemplary hardware and software environment for an apparatus 10 incorporating block-based image rotation consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer," although it should be appreciated the term "apparatus" may also include other suitable programmable electronic devices consistent with the invention.

Computer 10 typically includes a system bus 12 to which is coupled a central processing unit (CPU) 14 including one or more microprocessors coupled to a memory 16, which may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 16 may be considered to include memory storage physically located elsewhere in computer 10, e.g., any cache memory in a processor in CPU 14, as well as any storage capacity used as a virtual memory, e.g., as stored on a mass storage device or on another computer coupled to computer 10.

Additionally coupled to system bus 12 is a storage controller 18, which is used to provide access to various sources of non-volatile storage, e.g., a floppy or other removable disk drive, a hard disk drive, a direct access storage device (DASD), an optical drive (e.g., a CD drive, a DVD drive, etc.), and/or a tape drive, among others. Furthermore, computer 10 may also include a network controller 20 to provide an interface with one or more external networks (e.g., a LAN, a WAN, a wireless network, and/or the Internet, among others). Computer 10 also typically receives input from a user, e.g., via a keyboard, a mouse, a trackball, a joystick, a touchpad, and/or a microphone, among others. Display of information to a user is typically implemented through a graphics system including a graphics engine 22 that drives a display 24 such as a CRT monitor, an LCD display panel, etc. Additional user input and output may be received and transmitted from and to another computer or terminal via network controller 20.

To implement block-based image rotation consistent with the invention, a combination of various hardware and software components are utilized in computer 10. In particular, graphics engine 22 is implemented in computer 10 as a graphics controller disposed on a graphics or video adapter card. An operating system 26 shown resident in a program space of memory 16 utilizes various device drivers, including a display driver 28, to handle much of the input and output operations in the computer. Display driver 28 is specifically tailored for use with graphics engine 22, and it is within the display driver that much of the software-based functionality associated with block-based image rotation occurs.

The functionality in display driver 28 is typically accessed by one or more application programs 30 to ultimately draw or paint desired image data on display 24, in a process that is well understood in the art. In connection with such activities, display driver 28 typically builds desired images to be displayed in one or more virtual frame buffers 32, shown resident in a data space of memory 16.

Various additional software components that are utilized in connection with block-based image rotation consistent with the invention are also illustrated in memory 16, including a plurality of generic object descriptions 34 and a plurality of object block lists 36, 38 defined for a plurality of views A . . . X.

From a hardware standpoint, graphics engine 22 relies on a number of hardware components, including a rotation/translation controller 40, a local frame buffer 42 and a rotation buffer 44. Controller 40 is utilized to manage the hardware processing of image data rotation and translation. Local frame buffer 42 is a high speed memory utilized to store image data that is read out by a separate controller to drive display 24. Rotation buffer 44 is utilized to temporarily store image data, and may include rotation acceleration circuitry to rotate the image data stored therein using any of a number of known image data rotation circuits. Given that block sizes of only a few pixels on each side may be processed in the herein-described embodiments, it will be appreciated that a hardware-based rotation of the image data in a given block can be used in some embodiments to provide extremely fast rotation in a relatively simple and compact hardware circuit.

As will become more apparent below, block-based image rotation consistent with the invention may use a rotation buffer to rotate image data stored in a source memory and store the rotated image data in a destination memory. Precisely what hardware components are utilized for source and destination memories may differ in different embodiments, and may be supported in the configuration of computer 10 as shown in FIG. 1.

Figure 2A:
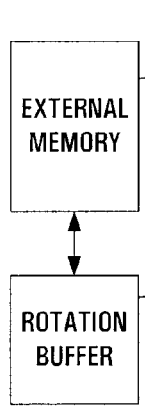
FIGS. 2A-2C are block diagrams illustrating different exemplary source/destination memory configurations suitable for use with a block-based image rotation algorithm consistent with the invention.

For example, as shown in FIG. 2A, both the source and destination memories utilized in connection with a rotation buffer 50 may be implemented using an external memory 52, e.g., to support rotation of image data stored in a virtual frame buffer. Moreover, the specific regions of the external memory from which image data is read and written back into may be the same, or may be different, with overlap handling as will be described in greater detail below used when the source and destination regions are the same.

Figure 2B:
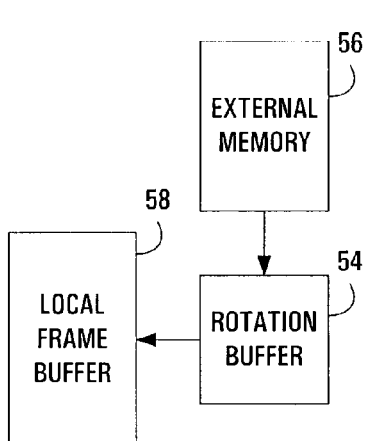
Figure 2C:
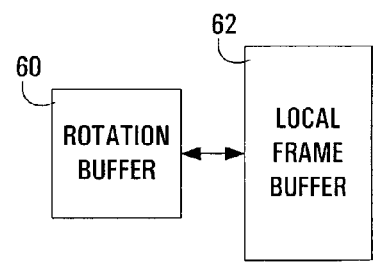

In the alternative, as shown in FIG. 2B, a rotation buffer 54 may utilize an external memory 56 as a source memory, while utilizing a local frame buffer 58 as a destination memory. In still other embodiments, e.g., as shown in FIG. 2C, a rotation buffer 60 may utilize a local frame buffer 62 as both the source and destination memories for use in connection with image rotation. Other configurations of source and destination memories may be utilized consistent with the invention.

Returning to FIG. 1, additional functionality, which is well understood by one of ordinary skill in the art having the benefit of the instant disclosure, may also be incorporated into graphics engine 22 consistent with the invention, including various 2D and 3D processing engines. Moreover, other combinations of hardware and software components may be utilized to implement the herein-described block-based image rotation functionality consistent with the invention. Therefore, the invention is not limited to the specific implementation discussed herein.

In general, from a software standpoint, the routines executed to implement any of the functionality utilized in the various embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Furthermore, from a hardware standpoint, any of the hardware-based functionality discussed herein is typically implemented in a circuit arrangement incorporating one or more integrated circuit devices as well as additional supporting electronic components. Moreover, as is well known in the art, integrated circuit devices are typically designed and fabricated using one or more computer data files, referred to herein as hardware definition programs, that define the layout of the circuit arrangements on the devices. The programs are typically generated by a design tool and are subsequently used during manufacturing to create the layout masks that define the circuit arrangements applied to a semiconductor wafer. Typically, the programs are provided in a predefined format using a hardware definition language (HDL) such as VHDL, verilog, EDIF, etc. While the invention has and hereinafter will be described in the context of circuit arrangements implemented in fully functioning integrated circuit devices and data processing systems utilizing such devices, those skilled in the art will appreciate that circuit arrangements consistent with the invention are also capable of being distributed as program products in a variety of forms, and that the invention applies equally regardless of the particular type of signal bearing media used to actually carry out the distribution.

Those skilled in the art will recognize that the exemplary environments illustrated in FIGS. 1 and 2A-2C are not intended to limit the present invention. Indeed, those skilled in the art will recognize that other alternative hardware and/or software environments may be used without departing from the scope of the invention.

Now turning to FIG. 3, a brief overview of an exemplary block-based image rotation routine 100 is illustrated in greater detail. The exemplary routine begins with a specification of the pixels that comprise an arbitrary-shaped image, the center of rotation C for the image, and a desired rotation angle about that center of rotation, typically in increments of 90 degrees.

Routine 100 begins in block 102 by converting the pixel image specification to an ordered list of rectangular blocks (A1 ... An), each with dimensions of m×n pixels, that completely defines the original image. As noted above, each block list also typically includes a center of rotation point C about which each pixel in the image is to be rotated, as well as the desired angle of rotation. Blocks may be equal in size to one another, or may be individually sized. It may be desirable to chose the specific sizes and shapes of the blocks to optimize rotation hardware resources, system data transfer characteristics (e.g. memory access burst size), memory technology (e.g. DRAM), and other concerns.

In addition, where the source and destination memories for an image are the same, it may be desirable to order the list of blocks to minimize potential conflicts between overlapping blocks. An overlapping block is a block from the list that when rotated has one or more pixels whose destination coordinates are the same as pixels from one or more subsequent blocks in the list. Identifying blocks that overlap subsequent blocks in the list can be determined at the time the block list is created or in real time during processing of the block list. It will be appreciated that since blocks may comprise multiple pixels, and since blocks may only partially overlap one another, a single overlapping block may overlap multiple blocks.

Next, block 104 initiates a loop to process each block in the ordered list, terminating the routine when all blocks have been processed. For each such block, block 106 generates a translation vector for the block to rotate the block the desired angle about the center of rotation C. Next, block 108 rotates the image data within the block the desired angle of rotation. Thereafter, in block 110, the translation vector generated in block 106 is applied to the block to determine a destination position for the block. This destination position is then used as an anchor position from which to store the rotated image data generated in block 108, whereby the block has then been rotated to its new position. Block 112 then removes the processed block from the list, and returns control to block 104 to process additional blocks in the list. Once all blocks are processed, and the list is empty, routine 100 is complete.

Generation and application of a translation vector to the various blocks defining an image may occur as follows. Blocks may be assigned anchor positions representing a single source location for each block. From these anchor positions, vectors relative to the center of rotation C, referred to herein as source rotation vectors, may be defined for the blocks. The source rotation vector for a block is a tuple of (x,y) coordinates representing the distance between an anchor position for a block and the center of rotation C. Put another way, for a block n having coordinates $(X_n, Y_n)$, the source rotation vector $(X_{Sn}, Y_{Sn})$ relative to a center of rotation point C having coordinates $(X_c, Y_c)$ may be computed as follows:

$$X_{Sn} = X_n - X_c$$

$$Y_{Sn} = Y_n - Y_c$$

For example, FIG. 4 illustrates an exemplary image 120 defined by a plurality of 2×2 pixel blocks 122, also denoted as A1-A6. Assuming the top left positions of the blocks are the anchor positions therefor, and a center of rotation having coordinates (8,8), the source rotation vectors 124 are as shown below in Table I:

TABLE I

Exemplary Source Rotation Vectors

| Block | $X_n$ | $Y_n$ | $X_{Sn}$ | $Y_{Sn}$ |
|---|---|---|---|---|
| 1 | 5 | 3 | −3 | −5 |
| 2 | 3 | 1 | −5 | −7 |
| 3 | 3 | 3 | −5 | −5 |
| 4 | 1 | 3 | −7 | −5 |
| 5 | 3 | 5 | −5 | −3 |
| 6 | 3 | 7 | −5 | −1 |

Given a source rotation vector Sn with the tuple $(X_{Sn}, Y_{Sn})$, destination rotation vectors Dan corresponding to 90, 180 and 270 degrees of rotation are respectively $(Y_{Sn}, -X_{Sn})$, $(-X_{Sn}, -Y_{Sn})$, and $(-Y_{Sn}, X_{Sn})$. From the source and destination rotation vectors, translation vectors Tan can be computed that define the number of horizontal and vertical pixels from a block's source location to its destination location. The translation vectors are the arithmetic differences between the destination and source rotation vectors as defined below:

For 90 degree rotation:

$$T90n = D90n - Sn = (Y_{Sn} - X_{Sn}, -X_{Sn} - Y_{Sn}).$$

For 180 degree rotation:

$$T180n = D180n - Sn = (-X_{Sn} - X_{Sn}, -Y_{Sn} - Y_{Sn}) = (-2X_{Sn}, -2Y_{Sn}).$$

For 270 degree rotation:

$$T270n = D270n - Sn = (-Y_{Sn} - X_{Sn}, X_{Sn} - Y_{Sn})$$

Each block's destination coordinates $(X_{dn}, Y_{dn})$ will be the sum of a block's source coordinates and the translation vector Tan corresponding to the area and desired rotation angle. As such, for a 90 degree rotation, the destination coordinates for an anchor position of a block are:

$$X_{dn} = Y_n + X_c - Y_c; \text{ and}$$

$$Y_{dn} = -X_n + X_c + Y_c.$$

Likewise, for a 180 degree rotation, the destination coordinates for a block are:

$$X_{dn} = 2X_c - X_n; \text{ and}$$

$$Y_{dn} = 2Y_c - Y_n.$$

The destination coordinates for a block undergoing a 270 degree rotation are:

$$X_{dn} = -Y_n + X_c + Y_c; \text{ and}$$

$$Y_{dn} = X_n - X_c + Y_c.$$

Therefore, for the exemplary image of FIG. 4, the block destination coordinates for 90, 180 and 270 degree rotations are shown at 120A, 120B, and 120C in FIG. 5, and set forth in Table II below:

TABLE II

Exemplary Block Destination Coordinates

| Block | 90 degree | | 180 degree | | 270 degree | |
|---|---|---|---|---|---|---|
| | $X_{dn}$ | $Y_{dn}$ | $X_{dn}$ | $Y_{dn}$ | $X_{dn}$ | $Y_{dn}$ |
| 1 | 3 | 11 | 11 | 13 | 13 | 5 |
| 2 | 1 | 13 | 13 | 15 | 15 | 3 |
| 3 | 3 | 13 | 13 | 13 | 13 | 3 |
| 4 | 3 | 15 | 15 | 13 | 13 | 1 |
| 5 | 5 | 13 | 13 | 11 | 11 | 3 |
| 6 | 7 | 13 | 13 | 9 | 9 | 3 |

In addition to the translation vector due to rotation, a separate position vector may also be added to each block's coordinates to position the rotated image at its final destination position.

Figure 6:
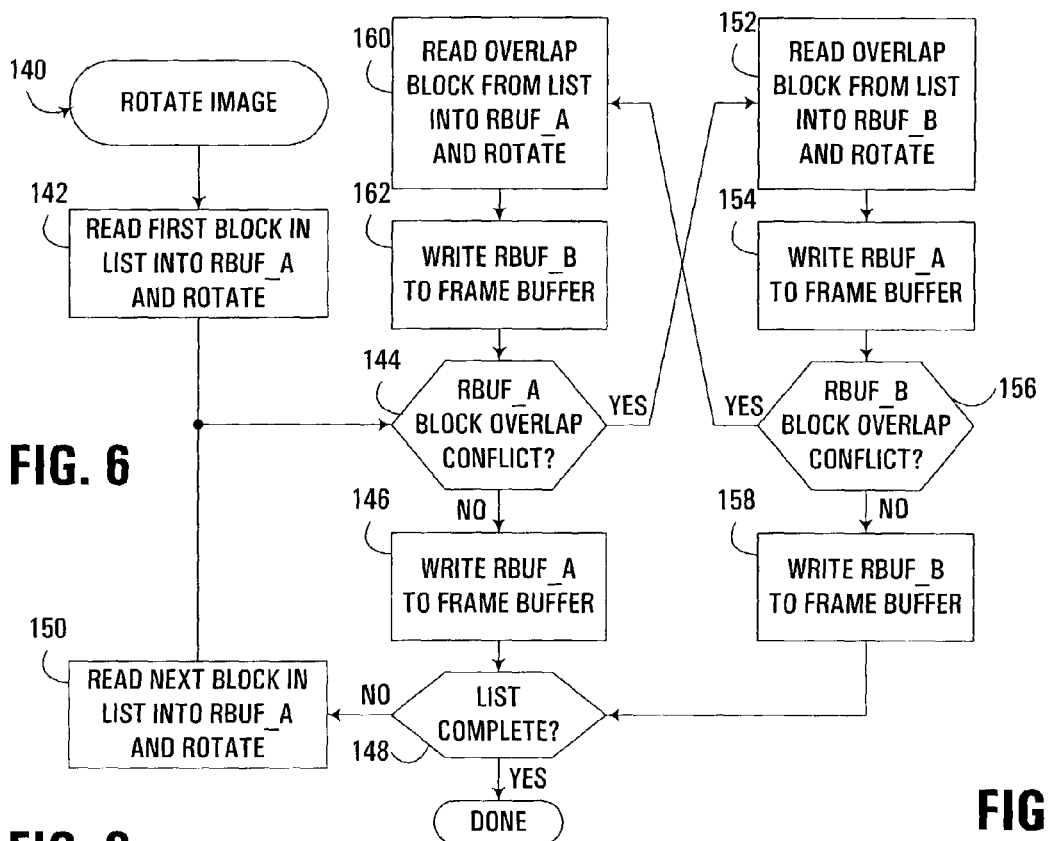
FIG. 6 is a flowchart illustrating an alternate image rotation routine to that of FIG. 3, for use handling overlaps between blocks in an image.

The basic block-based image rotation routine 100 above presumes no possibility of overlaps between blocks. However, where overlaps are possible (e.g., due to the source and destination memories being the same), it may be desirable to utilize multiple rotation buffers (or multiple block entries in a single rotation buffer) to facilitate the handling of overlaps during image rotation. FIG. 6, for example, illustrates an image rotation routine 140 that relies upon two rotation buffers identified as RBUF_A and RBUF_B, and used in connection with an embodiment where a common frame buffer is used as the source and destination memory. Routine 140 also presumes that at most one block may be overlapped at a time. Where additional overlaps are possible, additional rotation buffers may be used, as will be apparent to one of ordinary skill in the art having the benefit of the instant disclosure.

Routine 140 begins in block 142 by reading in the pixel data associated with a first block in the list from the frame buffer or other source memory and storing it in RBUF_A. The pixel data in RBUF_A is rotated and a test is then performed in block 144 to determine if the intended destination conflicts or overlaps with another block in the list. If there is no conflict, the rotated block is written to the frame buffer in a location determined by the center of rotation and the desired rotation angle, as calculated in the manner described above, in block 146. The block is then removed from the list, and control passes to block 148 to determine whether the list is complete. If not, control passes to block 150 to read in a next block of pixel data and rotate the pixel data, and then to block 144 to determine if a conflict has occurred with the new block. Otherwise, once the list is complete, routine 140 terminates.

Returning to block 144, if an overlap conflict is detected, the pixel data from the block in conflict is read into RBUF_B in block 152, and then rotated. The rotated data in RBUF_A is then written to its destination in block 154 and removed from the list. Control then passes to block 156 to determine whether the intended destination of the pixel data in RBUF_B conflicts or overlaps with another block in the list. If not, control passes to block 158 to write the rotated block to the frame buffer in the required destination location, and to remove the block from the list. Control then passes to block 148 to process additional blocks in the list, if necessary.

Returning to block 156, if an overlap is detected for the pixel data in RBUF_B, the pixel data from the block in conflict is read into RBUF_A in block 160, and then rotated. The rotated data in RBUF_B is then written to its destination in block 162 and removed from the list. Control then passes to block 144 to determine whether the intended destination of the pixel data in RBUF_A conflicts or overlaps with another block in the list, which operates in the manner previously described above. The above processing sequence continues until all blocks in the list have been rotated and translated.

Next, one specific implementation of the invention using a combination of hardware and software is disclosed. In the illustrated implementation, functions such as creating the block list, supervising the rotation and enabling of pointers, as well as the initial generation of image data are allocated to software, while functions such as actual rotation of image data from a block, processing of a block list, and accesses to memory are handled in hardware. It will be appreciated, however, that other partitions of hardware and software may be utilized in other embodiments.

It is assumed for the purposes of this implementation that an image is constructed from a plurality of objects defined by generic object descriptions. For example, this implementation of the invention may have applicability in a Windows-based graphical user interface, where objects such as icons, windows, toolbars, etc. are placed on a composite desktop image to provide interaction with a user. Each of these objects may therefore be separately represented and combined on demand to generate a desired display.

Generic object descriptions may be stored in a memory as shown at 34 in FIG. 1. Moreover, generic objects may be instantiated for different views, e.g., to support different layouts of objects for different situations. As an example, consider a display that is switchable between landscape and portrait views, e.g., to support a hand-held computer that may be positioned in two different orientations relative to a user. It may be desirable in such circumstances to define separate views, with instantiated objects placed at different locations in each of the views as desired.

To support placement of an object in multiple views, the herein-described implementation instantiates an object for each view, based upon a common generic object description. Associated with a particular instantiation of an object in a particular view is a predetermined rotation and/or a translation, indicating where on the view, and at what angle, a particular object is to be located. Each view, or instantiation, of an object is therefore represented in the herein-described implementation by a block list for the object, as illustrated at 36 and 38 in FIG. 1.

Routine 170 of FIG. 7 is therefore utilized to generate a multi-view image composed of a plurality of objects, each having a translation and/or rotation relative to its generic representation for placement at a specific location and/or orientation on a particular view.

Routine 170 begins in block 172 by generating a generic object description for a first object, e.g., by generating image data representative of an object, and independent of any particular translation or rotation associated with a particular view.

Once a generic object description has been created, block 174 then decomposes the object into an ordered list of rectangular blocks. As noted above, the blocks may be of similar size, or may be differently sized as desired. The blocks are typically laid out to encompass an entire object, which may be rectangular in shape, or more typically, non-rectangular. The sizes of each block may be selected based upon any number of factors. For example, the sizes of blocks may be selected to optimize data transfer performance based upon burst lengths supported by the graphics hardware. Smaller block sizes tend to reduce the amount of rotation buffer memory required during reading of source memory and writing of destination memory.

As described above, in addition to creating a list of blocks, it is also desirable to order the list of blocks to minimize any overlaps between blocks during rotation. In the event of an overlapped block, it may be desirable to place each overlapped block in the block list immediately following the block whose rotation causes the overlap. This ordering policy simplifies block list processing. In embodiments where source and destination memories are different, however, overlaps may not be a concern, whereby other concerns such as memory performance issues, e.g., page boundaries, relative memory access speeds, prefetching characteristics, etc. may be used to order a list of blocks.

Once the object has been decomposed into an ordered list of rectangular blocks, control passes to block 176 to create a block list header, which stores a number of parameters relative to an object, including, for example, the number of blocks in the list, the desired rotation angle, the pitch between the source and destination memories, a center of rotation, a position vector (representing the x, y distance to translate the object instantiation on a composite image), etc.

Next, block 178 is optionally executed to compute a block destination address for the first block in the block list, in the manner described above based upon the desired angle and center of rotation for performing rotation of the block. In addition, a position vector may be applied to position the destination address at a particular translated location on the image. In some embodiments, however, block 178 may be omitted from routine 170, whereby computation of a destination address for each block is performed dynamically during the processing of each block by graphics engine 22.

Next, block 180 sets an overlap flag for the current block to equal the number of blocks that are overlapped by the block as a result of rotation. In embodiments where only at most one block can be overlapped, the overlap flag may be a binary flag. Otherwise, a zero value for the overlap flag for a particular block will indicate no overlap, while any non-zero value will indicate the number of subsequent blocks in the ordered list that are overlapped by the current block.

Next, block 182 sets a backfill flag for a block if backfilling of the original position of the block is required. In particular, it may be determined from analysis of a block list whether, after rotation of a block, the original location of that block will be covered by another block from the image. If not, it may be desirable in some embodiments to paint a background color such as a transparent color or a backfill color at the original location of the block. As such, block 182 supports an optional backfill feature that may be associated with a particular block.

Once block 182 is complete, control passes to block 184 to process additional blocks in the current ordered list being processed by routine 170. For each additional block, control returns to block 178 to compute the destination address for that block. Once all blocks in an ordered list have been processed, block 184 passes control to block 186 to determine whether any more views of the current object need to be generated. For each such additional view, block 186 passes control to block 174 to decompose the object into another ordered list of rectangular blocks that are optimized for the new view. Once all views have been processed, block 186 passes control to block 188.

Block 188 determines whether any more objects remain to be created. If so, block 188 passes control to block 172 to create a new generic object description for a new object. Otherwise, once all objects have been created, routine 170 is complete.

As such, it may be seen that routine 170 may be utilized to create multiple views of a plurality of objects for use in constructing one or more composite images. Typically, the functionality of routine 170 will be implemented in software, and may be generated dynamically during runtime of the application software, or may be performed during development of a software application, when, for example, it is known that a certain set of objects will be utilized by the application software every time it is run. Other implementations will be apparent to one of ordinary skill in the art.

Figure 8:
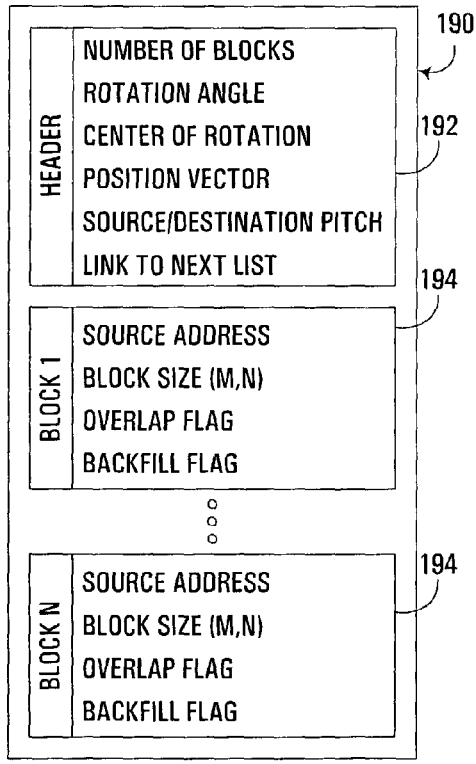
FIG. 8 is a block diagram of an exemplary block list data structure capable of being generated by the routine of FIG. 7, and suitable for use in connection with dynamic generation of block destination addresses.
Figure 9:
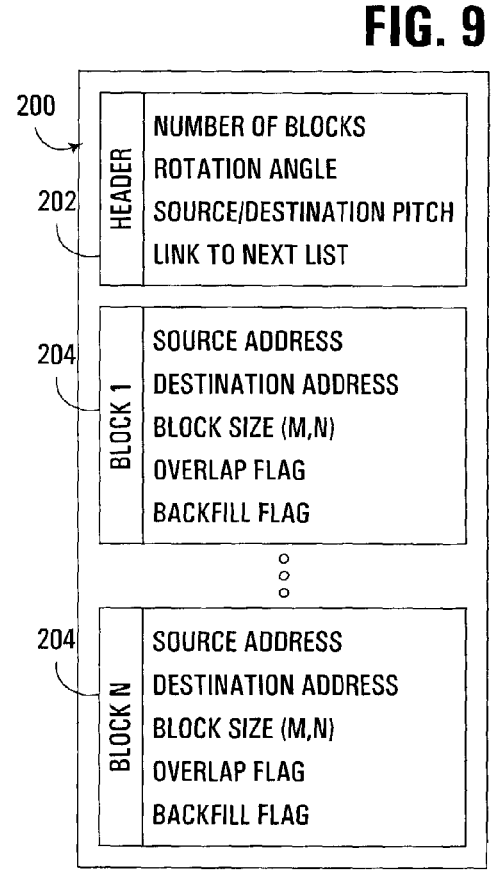
FIG. 9 is a block diagram of another exemplary block list data structure capable of being generated by the routine of FIG. 7, and suitable for use in connection with pre-stored block destination addresses.

FIGS. 8 and 9 next illustrate a pair of ordered object lists 190, 200 that may be generated by routine 170 of FIG. 7. Object list 190 is of the type that may be generated by routine 170 for use in connection with a graphics engine that is capable of dynamically generating destination addresses for the various blocks in a block list. As such, object list 190 includes a header 192 including fields that represent the number of blocks in the list, the desired rotation angle, the center of rotation, a position vector representing the amount to translate the block in x, y coordinates, and a source/destination pitch parameter that stores the number of columns in the buffer to permit differently sized displays to be supported. In addition, header 192 may include a link to a next object list stored in the memory.

Object list 190 also includes a plurality of block records 194 storing the identification data for each block in the list. For each such block, a record 194 includes a source address, indicating the anchor position of the block in an un-rotated state, a block size representing the size of the block in mxn coordinates, an overlap flag indicating the number of other blocks overlapped by the block upon rotation, and a backfill flag indicating whether the original position of the block should be backfilled after rotation.

Object list 200 of FIG. 9, on the other hand, is utilized in situations where the graphics engine does not dynamically generate destination addresses for object blocks, but rather where the destination addresses are pre-generated by routine 170 and stored within the object list itself. In this implementation, a header 202 stores only the number of blocks, the rotation angle, the source/destination pitch and the link to the next list, if any. Each block record 204, on the other hand, stores in addition to the source address, block size, overlap flag and backfill flag, a destination address that has been pre-computed by routine 170.

It will be appreciated that practically any data structure may be utilized to represent object lists in a manner consistent with the invention. Therefore, the invention is not limited to the particular data structures described herein.

FIG. 10 next illustrates the block list processing components utilized to process a block list that has been created by routine 170. In the illustrated embodiment, the various components in FIG. 10 are implemented in hardware. Specifically, a source memory 210 is shown supplying image data to a block read process 212. The block read process then outputs data to a rotation buffer/first-in-first-out (FIFO) buffer 214 that is utilized to store image data for one or more blocks and to rotate such image data on an as-needed basis. Rotated image data is then provided to a block write process 216, which outputs image data to a destination memory 218. Buffer 214 also provides FIFO full and FIFO empty signals to processes 212, 216. Moreover, process 216 provides a pixel address to rotation buffer 214, the use of which will be described in greater detail below.

In the illustrated embodiment, processes 212, 216 are implemented in a rotation/translation controller such as controller 40 of FIG. 1. Moreover, source memory and destination memory 210, 218 may be separate memories, or may be the same memory, e.g., local frame buffer 42 of FIG. 1.

Moreover, rotation buffer 214 may optionally support hardware-based rotation of image data on a block-by-block basis. In the alternative, rotation of block data may be provided via non-sequential access of the rotation buffer data in a manner similar to some conventional hardware-based image rotation algorithms. However, given that the rotation buffer may be implemented in a high speed memory such as SRAM, the performance penalties that would otherwise occur with an external memory may not be present even when hardware-based rotation circuitry is not incorporated into buffer 214.

FIG. 11 illustrates block read process 212 in greater detail. Process 212 begins in block 222 by reading the block list header information for a block list input to the process from the source memory. Next, block 224 reads the block description information for a first block from the block list. Block 226 then determines whether the FIFO full signal has been asserted by the rotation buffer, and passes control to block 230 once it is determined that the FIFO is not full.

Block 230 writes a block control word to the FIFO. The block control word may include, for example, the destination address, block size, overlap flag, and backfill flag from the block description. Next, block 232 reads the image data from the block from the source memory, as stored at the source destination specified in the block description. Control then passes to block 234 to check to see if the FIFO is currently full. Once it is determined that the FIFO is not full, control passes to block 238 to write the image data for the block to the FIFO. Block 240 then determines whether more data needs to be written for the block. If so, control returns to block 232. Otherwise, control passes to block 242 to determine whether any more blocks remain in the block list. If so, block 242 passes control to block 224 to read the block description for the next block in the list. Otherwise, block 242 passes control to block 244 to determine whether any more objects need to be retrieved from the source memory. If so, control returns to block 222 to read the block list header information for the next object. Otherwise, block 244 terminates routine 212.

FIG. 12 next illustrates block write process 216 in greater detail. Routine 216 begins in block 252 by reading the next block control word from the FIFO. Next, block 254 determines whether the backfill flag for the block control word has been set. If so, control passes to block 256 to write the background color to the block source address in the destination memory, thus clearing the image data for the original position of the block. Control then passes to block 258 to determine whether the overlap flag is equal to zero. In addition, returning to block 254, if the backfill flag is not set, block 256 is bypassed, and control is passed directly to block 258.

If the overlap flag is not set to zero, block 258 passes control to block 260 to determine whether all overlapped blocks are currently stored in the FIFO. This determination may be based, for example, on determining whether the next n blocks in the ordered list have been passed to the FIFO, where n is the value of the overlap flag for the currently-processed block. If all overlapped blocks are not yet in the FIFO, block 260 waits until all such blocks have been stored in the FIFO. At that time, control passes to block 264 to optionally compute the block destination address. Such a computation occurs in embodiments where the graphics engine supports the capability to dynamically generated block destination addresses. In other embodiments, where block destination addresses are computed by a create block list routine such as routine 170 of FIG. 7, block 264 is omitted from process 216.

Next, block 266 rotates and writes the image data for the block to the destination address for the block. The rotation of the image data may either occur under the control of process 216 by choosing non-sequential pixel addresses shown as outputs of process 216, or may simply be the result of the output of FIFO 214 once the FIFO is provided with an angle of rotation. In either case, data written to the destination memory may be written in an order and using a data width that optimizes the write performance of destination memory.

Next, block 268 determines whether the FIFO is empty, by polling the FIFO empty signal from FIFO 214. If so, block 268 waits for a non-empty state, and then passes control to block 272 to determine whether the additional data in the FIFO is additional block data. If so, control passes to block 264. Otherwise, control returns to block 252 to read the next block control word from the FIFO.

It may therefore be seen that, through the interaction of processes 212, 216, blocks capable of being overlapped due to the rotation of another block must be loaded into the FIFO prior to writing of an overlapping block to its destination address.

As noted above, the writing of image data for a block to the destination address in block 266 of process 216 may occur in a number of manners consistent with the invention. For example, FIG. 13 illustrates an exemplary rotation buffer address generation circuit 300 that may be utilized by process 216 to generate pixel addresses for non-sequentially reading pixels from a block in rotation buffer 214.

Circuit 300 includes a pair of up/down counters 302, 304 that respectively output to a multiplier 306 and summer 308. Counter 302 is a Mod-n counter that receives as input a value n representing the number of rows in a block of image data prior to rotation. Counter 304 is a Mod-m counter that receives as input a value m representing the number of columns in a block of image data prior to rotation. Each counter 302, 304 also is respectively controlled by an nCntUp and mCntUp signal that causes the counter to count up when set to binary 1, and to count down when set to binary 0. The output of counter 302, as noted above, is output to multiplier 306, multiplies the output of counter 302 by the value of m, the result of which is then provided to summer 308 to be summed with the output of counter 304. The output of summer 308 is the address used to read from the rotation buffer, and thus functions as an index into a block of image data.

Each counter 302, 304 also includes a carry in (CI) input and a carry out (CO) output. The CO output of counter 304 is coupled to one input of an AND gate 310, with the other input of AND gate 310 coupled to receive an nCntrMS signal, and with the output of AND gate 310 coupled to the CI input of counter 302. The CO output of counter 302 is in turn coupled to one input of another AND gate 312, with the other input of AND gate 312 coupled to receive an mCntrMS signal, and with the output of AND gate 312 coupled to the CI input of counter 304. The nCntrMS and mCntrMS signals are asserted in a mutually-exclusive manner, and used to control which of counters 302, 304 represent the most significant bits of the rotation buffer address.

To perform suitable non-sequential reads to the rotation buffer using circuit 300, the control signals nCntrMS, nCntUp, mCntrMS and mCntUp are set as shown below in Table III, based upon the desired angle of rotation:

TABLE III

Rotation Buffer Address Generation Circuit Control Settings

| Rotation | 0 | 90 | 180 | 270 |
|---|---|---|---|---|
| nCntrMS | 1 | 0 | 1 | 0 |
| nCntUp | 1 | 0 | 0 | 1 |
| mCntrMS | 0 | 1 | 0 | 1 |
| mCntUp | 1 | 1 | 0 | 0 |

In cases where a counter is configured to count up, the counter is initialized to a value of 0. On the other hand, where a counter is configured to count down, the counter is initialized to its maximum value (i.e., n−1 for counter 302).

To provide an example of the operation of circuit 300, Table IV below shows the address values generated by circuit 300 for an exemplary 4×3 block (m=4, n=3) for rotation angles of 0, 90, 180 and 270 degrees, assuming that, in an unrotated state, the block is read left to right, top to bottom, with addresses of 0 (top left) to 11 (bottom right):

TABLE IV

Rotation Buffer Read Addresses for 4 × 3 Block

| Index | 0 deg | 90 deg | 180 deg | 270 deg |
|---|---|---|---|---|
| 0 | 0 | 8 | 11 | 3 |
| 1 | 1 | 4 | 10 | 7 |
| 2 | 2 | 0 | 9 | 11 |
| 3 | 3 | 9 | 8 | 2 |
| 4 | 4 | 5 | 7 | 6 |
| 5 | 5 | 1 | 6 | 10 |
| 6 | 6 | 10 | 5 | 1 |
| 7 | 7 | 6 | 4 | 5 |
| 8 | 8 | 2 | 3 | 9 |
| 9 | 9 | 11 | 2 | 0 |
| 10 | 10 | 7 | 1 | 4 |
| 11 | 11 | 3 | 0 | 8 |

It should be appreciated that, when writing out the image data from the rotation buffer in block 266 of process 216, a sequential write to the destination memory is performed, which permits the process to take advantage of the typical burst capabilities of a destination memory. The generation of write addresses may be performed by a collection of counters and comparators to increment a write address appropriately depending upon the orientation of the block after rotation. For example, Table V below shows the sequence of write addresses that might be generated for writing to a destination memory for the same 4×3 block size discussed above, assuming a destination address of 100 and a destination pitch of 480:

TABLE V

Destination Memory Write Addresses for 4 × 3 Block

| Index | 0 deg | 90 deg | 180 deg | 270 deg |
|---|---|---|---|---|
| 0 | 100 | 100 | 100 | 100 |
| 1 | 101 | 101 | 101 | 101 |
| 2 | 102 | 102 | 102 | 102 |
| 3 | 103 | 580 | 103 | 580 |
| 4 | 580 | 581 | 580 | 581 |
| 5 | 581 | 582 | 581 | 582 |
| 6 | 582 | 1060 | 582 | 1060 |
| 7 | 583 | 1061 | 583 | 1061 |
| 8 | 1060 | 1062 | 1060 | 1062 |
| 9 | 1061 | 1540 | 1061 | 1540 |
| 10 | 1062 | 1541 | 1062 | 1541 |
| 11 | 1063 | 1542 | 1063 | 1542 |

As discussed above, the manner in which blocks are ordered in a list can significantly impact both the resource overhead and the efficiency of an image rotation algorithm consistent with the invention. To illustrate this concept, FIG. 14 depicts an exemplary object 280 including a set of twelve blocks, A1-A12 to be rotated about a center of rotation C. It may be desirable for such an object to represent a block list in the form of an n-ary tree data structure, where the various block A1-A12 are represented as nodes in the tree data structure. In the embodiment illustrated in FIGS. 7-13, each block is read from the source memory to the FIFO in a left-to-right breadth-first order based upon the defined tree structure for the object list. Similarly, each block is written to its destination location only after all of its dependencies have been stored in the FIFO. Given the collection of blocks in object 280 of FIG. 14, a number of different tree data structures may be utilized to represent the interdependencies of the blocks in an ordered object list.

FIG. 15, for example, illustrates one exemplary tree data structure 290 that may be generated as a result of a 90 degree rotation about center of rotation C. Under this tree structure, block A1 is shown to overlap blocks A2, A4, A6 and A8, and likewise, block A2 is shown to be overlapping blocks A9, A10, A11 and A12. Under such a configuration, the load/store (L/S) and order that these blocks are loaded into and written out of the FIFO by processes 212, 216 of FIG. 10 would be as follows:

L1, L2, L4, L6, L8, S1, L9, L10, L11, L12, S2, S4, S6, S8, S9, S10, S11, S12, L3, S3, L5, S5, L7, S7.

It should be noted from this sequence that, prior to the storing of block A2 into the destination memory, FIFO 214 would be required to store eight blocks (blocks A2, A4, A6, A8, A9, A10, A11 and A12) in the FIFO. Thus, a minimum FIFO size sufficient to store eight blocks worth of image data would be required.

In contrast, an alternate tree data structure 292, illustrated in FIG. 16, may also be used to represent the same object list for object 280 of FIG. 14. It should be noted that, in tree data structure 292, blocks A2, A4, A6, and A8 are rearranged, which enables each of these blocks to have only one overlapped block, A9, A10, A11 and A12, respectively. By rearranging the tree in this manner, the load/store order for the FIFO by processes 212 and 216 would be as follows:

L1, L8, L6, L4, L2, S1, L9, S8, L10, S6, L11, S4, L12, S2, S9, S10, S11, S12, L3, S3, L5, S5, L7, S7.

It should be noted that, in this configuration, at most five blocks are required to be resident in the FIFO at any given time. As such, a smaller FIFO may be utilized to process tree data structure 292 versus tree data structure 290.

The herein-described embodiments offer a number of advantages over conventional software and hardware techniques. As noted above, conventional software techniques typically require a matrix multiplication computation for each pixel of the rotated image, which can consume a significant amount of computational resources and, more importantly for mobile and handheld devices, power. In contrast, image rotation when implemented in the manner described herein may be performed in a rotation buffer that incorporates acceleration hardware to facilitate the rotation of image data in manageable sized blocks. For mobile and information appliance applications that need to support multiple display orientations, software development time can be reduced because a single frame buffer image can be developed for an application and several orientations created from that single image by using different block lists.

Also, conventional hardware approaches that perform non-sequential access of the frame buffer greatly limit the type of memory and bus architectures that can be supported with the frame buffer. A frame buffer implemented in DRAM for example will add a significant performance penalty when accessing pixel data from non-sequential addresses. A rotation operation by nature will cause non-sequential data access, but by performing the rotation in a buffer as described herein, many of the non-sequential accesses can be eliminated. Also, conventional hardware approaches tend to not integrate well with other 2D graphics operations such as chroma-key (blue-screen) and filtering/scaling. Because the herein-described method can be performed directly on data in the frame buffer just like 2D graphics operations, it can be easily integrated with other 2D functions and even share some of the same hardware resources (such as buffers needed for performing the rotation operation). Conventional hardware approaches based on non-sequential access of the frame buffer are also constrained by the requirement to output pixels to a display controller in the exact order that the pixels will be processed by the display electronics. The herein-described methods are not similarly constrained, and may support, for example, the rotation of images of arbitrary size and/or shape.

Furthermore, given the support for arbitrary-shaped images, the herein-described algorithms may additionally provide greater performance than conventional algorithms in instances where images are processed based upon the assumption that the images are rectangular in nature. In particular, where an image, if bounded by a rectangular perimeter, would otherwise contain a substantial amount of whitespace, rotation of that image by a conventional algorithm would likely result in the rotation of otherwise unnecessary image data. In contrast, supporting the ability to rotate arbitrarily-shaped images as described herein, an object list may be defined to bound only the important image data, thus reducing the number of blocks versus a rectangular region, and thus reducing the processing overhead associated with rotation of the image data.

Other advantages and modifications will be apparent to one of ordinary skill in the art having the benefit of the instant disclosure. The invention therefore lies in the claims hereinafter appended.

What is claimed is:

1. A method of rotating image data, the method comprising, for each of a plurality of blocks of image data defining an image:
   (a) applying a translation vector to the block to translate the block a desired angle of rotation about a rotation point; and
   (b) rotating the image data within the block according to the desired angle of rotation wherein the rotation point is common to the plurality of blocks, and wherein applying the translation vector comprises generating a source rotation vector representing a distance between the rotation point and an anchor position of the block.

2. The method of claim 1, wherein applying the translation vector further comprises generating the translation vector based upon a difference between a destination rotation vector associated with the desired angle of rotation and the source rotation vector.

3. The method of claim 2, wherein the rotation point has coordinates of $(X_c, Y_c)$, wherein the anchor position of a block n from the plurality of blocks has coordinates of $(X_n, Y_n)$, wherein the source rotation vector for block n has coordinates $(X_{sn}, Y_{sn})$, and wherein:

$X_{sn} = X_n - X_c$; and $Y_{sn} = Y_n - Y_c$.

4. The method of claim 3, wherein the angle of rotation is selected from the group consisting of 90, 180 and 270 degrees, wherein the destination rotation vector associated with a 90 degree angle of rotation is equal to $(Y_{sn}, -X_{sn})$, wherein the destination rotation vector associated with a 180 degree angle of rotation is equal to $(-X_{sn}, -Y_{sn})$, and wherein the destination rotation vector associated with a 270 degree angle of rotation is equal to $(-Y_{sn}, X_{sn})$.

5. The method of claim 2, wherein applying the translation vector to the block further includes generating a translated anchor position for the block by summing the anchor position of the block with the translation vector.

6. The method of claim 1, wherein the rotation point is common to the plurality of blocks with coordinates of $(X_c, Y_c)$, wherein the block is a block n from the plurality of blocks having an anchor position with coordinates of $(X_n, Y_n)$, wherein the angle of rotation is 90 degrees, wherein applying the translation vector to the block comprises generating a translated anchor position for the block n having coordinates $(X_{dn}, Y_{dn})$, and wherein:

$X_{dn} = Y_n + X_c - Y_c$; and $Y_{dn} = -X_n + X_c + Y_c$.

7. The method of claim 1 wherein the rotation point is common to the plurality of blocks with coordinates of $(X_c, Y_c)$, wherein the block is a block n from the plurality of blocks having an anchor position with coordinates of $(X_n, Y_n)$, wherein the angle of rotation is 180 degrees, wherein applying the translation vector to the block comprises generating a translated anchor position for the block n having coordinates $(X_{dn}, Y_{dn})$, and wherein:

$X_{dn} = 2X_c - X_n$; and $Y_{dn} = 2Y_c - Y_n$.

8. The method of claim 1, wherein the rotation point is common to the plurality of blocks with coordinates of $(X_c, Y_c)$, wherein the block is a block n from the plurality of blocks having an anchor position with coordinates of $(X_n, Y_n)$, wherein the angle of rotation is 270 degrees, wherein applying the translation vector to the block comprises generating a translated anchor position for the block n having coordinates $(X_{dn}, Y_{dn})$, and wherein:

$X_{dn} = -Y_n + X_c + Y_c$; and $Y_{dn} = X_n - X_c + Y_c$.

9. A method of rotating image data, the method comprising, for each of a plurality of blocks of image data defining an image:
   (a) applying a translation vector to the block to translate the block a desired angle of rotation about a rotation point;
   (b) rotating the image data within the block according to the desired angle of rotation;
   (c) generating a plurality of blocks from the image; and
   (d) determining a source rotation vector for each block representative of a difference between the rotation point and the anchor position for each block.

10. The method of claim 9, wherein the plurality of blocks are arranged in an ordered list.

11. The method of claim 10, further comprising arranging the plurality of blocks into the ordered list.

12. The method of claim 10, wherein the plurality of blocks are arranged into the ordered list to minimize detection of overlaps during rotation of the plurality of blocks.

13. The method of claim 10, further comprising removing a block from the ordered list after applying the translation vector to the block and rotating the image data within the block.

14. The method of claim 10, further comprising detecting whether a translated block would overlap another block among the plurality of blocks, and if so, copying the overlapped block to a rotation buffer.

15. The method of claim 14, further comprising, after copying the overlapped block to the rotation buffer, applying a translation vector to the overlapped block to translate the overlapped block the desired angle of rotation about the rotation point, and rotating the image data within the overlapped block according to the desired angle of rotation.

16. The method of claim 14, wherein detecting whether the translated block would overlap another block includes detecting that the translated block overlaps multiple blocks, and wherein copying the overlapped block to the rotation buffer includes copying the multiple blocks to at least one rotation buffer.

17. A method of rotating image data for each of a plurality of blocks of image data defining an image, comprising:
(a) applying a translation vector to the block to translate the block a desired angle of rotation about a rotation point;
(b) rotating the image data within the block according to the desired angle of rotation;
(b) retrieving the block from a source memory; and
(c) storing the translated block in a destination memory, wherein the source and destination memories are the same memory.

18. The method of claim 17, wherein the plurality of blocks define a non-rectangular boundary for the image.

19. The method of claim 17, wherein the image includes at least one object, and wherein the plurality of blocks are associated with a first view of the object.

20. The method of claim 17, further comprising backfilling an original location of a block.

21. The method of claim 17, further comprising:
(a) loading image data for each block into a rotation buffer; and
(b) writing the image data for a block from the rotation buffer into a destination memory only after the image data for each block overlapped by such block has been loaded into the rotation buffer.

22. A method of rotating image data, the method comprising:
(a) rotating a first block among a plurality of blocks of image data from an image to be rotated;
(b) determining whether the rotated first block overlaps another block among the plurality of blocks;
(c) if the rotated first block overlaps another block, copying the overlapped block to a rotation buffer prior to storing the rotated first block in a frame buffer;
(d) rotating the overlapped block after storing the overlapped block in the rotation buffer; and
(e) storing the rotated overlapped block in the frame buffer.

23. The method of claim 22, wherein the plurality of blocks are arranged in an ordered list, the method further comprising removing the first block from the ordered list after the rotated first block is stored in the frame buffer.

24. An apparatus comprising:
(a) a memory configured to store a plurality of blocks of image data defining an image; and
(b) a circuit arrangement coupled to the memory and configured to translate each block among the plurality of blocks a desired angle of rotation about a rotation point by applying a translation vector to the block, and to rotate the image data within each block according to the desired angle of rotation
wherein the rotation point is common to the plurality of blocks, and wherein the circuit arrangement is configured to apply the translation vector by generating a source rotation vector representing a distance between the rotation point to an anchor position of the block, generating the translation vector based upon a difference between a destination rotation vector associated with the desired angle of rotation and the source rotation vector; and generating a translated anchor position for the block by summing the anchor position of the block with the translation vector.

25. The apparatus of claim 24, wherein the rotation point has coordinates of $(X_c, Y_c)$, wherein the anchor position of a block n from the plurality of blocks has coordinates of $(X_n, Y_n)$, wherein the source rotation vector for block n has coordinates $(X_{sn}, Y_{sn})$ and wherein:

$$X_{sn}=X_n-X_c; \text{ and}$$

$$Y_{sn}=Y_n-Y_c;$$

wherein the angle of rotation is selected from the group consisting of 90, 180 and 270 degrees, wherein the destination rotation vector associated with a 90 degree angle of rotation is equal to $(Y_{sn}, -X_{sn})$, wherein the destination rotation vector associated with a 180 degree angle of rotation is equal to $(-X_{sn}, -Y_{sn})$, and wherein the destination rotation vector associated with a 270 degree angle of rotation is equal to $(-Y_{sn}, -X_{sn})$.

26. The apparatus of claim 24 wherein each block is configured as a rectangular array of pixels.

27. The apparatus of claim 24, wherein the circuit arrangement is configured to rotate the image data within the block according to the desired angle of rotation by rotating the image data within the block one of 90 degrees, 180 degrees and 270 degrees.

28. The apparatus of claim 24, wherein the circuit arrangement includes a rotation buffer configured to rotate die image data within the block.

29. The apparatus of claim 24, wherein the circuit arrangement is further configured to generate the plurality of blocks from the image and determine an anchor position for each block.

30. The apparatus of claim 29, wherein the circuit arrangement is further configured to determining a source rotation for each block representative of a difference between the rotation point and the anchor position for each block.

31. The apparatus of claim 24, wherein the plurality of blocks are arranged in an ordered list.

32. The apparatus of claim 31, wherein the plurality of blocks are arranged into the ordered list to minimize detection of overlaps during rotation of the plurality of blocks.

33. The apparatus of claim 31, wherein the circuit arrangement is further configured to remove a block from the ordered list after applying the translation vector to the block and rotating the image data within the block.

34. The apparatus of claim 31, wherein the circuit arrangement is further configured to detect whether a translated block would overlap another block among the plurality of blocks, and if so, to copy the overlapped block to a rotation buffer.

35. The apparatus of claim 34, wherein the circuit arrangement is further configured to, copying the overlapped block to the rotation buffer, apply a translation vector to the overlapped block to translate the overlapped block the desired angle of rotation about the rotation point, and rotate the image data within the overlapped block according to the desired angle of rotation.

36. The apparatus of claim 24 wherein the circuit arrangement is further configured to retrieve the block from the memory and to store the translated block in a different memory.

37. The apparatus of claim 24 wherein the circuit arrangement is further configured to retrieve the block from the memory and to store the translated block in the memory.

38. The apparatus of claim 24, wherein the memory is selected from the group consisting of a frame buffer and an external memory.

39. A circuit arrangement, comprising:
   (a) a rotation buffer; and
   (b) a circuit coupled to the rotation buffer and configured to rotate an image by, for each of a plurality of blocks of image data defining the image, retrieving image data for the block into the rotation buffer, applying a translation vector to the block to translate the block a desired angle of rotation about a rotation point, and rotating the image data in the rotation buffer according to the desired angle of rotation, wherein the circuit comprises a processor and program code configured to execute on the processor to apply the translation vector to the block and initiate rotation of the image data in the rotation buffer.

40. An integrated circuit comprising the circuit arrangement of claim 39.

41. A computer readable medium storing a program comprising a hardware definition program defining the circuit arrangement of claim 39 and a signal bearing medium bearing the hardware definition program, wherein the signal bearing medium includes at least one of a recordable medium and a transmission medium.

* * * * *